United States Patent [19]
Hagiuda et al.

[11] Patent Number: 5,608,476
[45] Date of Patent: Mar. 4, 1997

[54] FLASH BRACKET WITH GRIP

[75] Inventors: Nobuyoshi Hagiuda, Yokohama; Hiroshi Sakamoto, Kawasaki, both of Japan

[73] Assignee: Nikon Corporation, Tokyo, Japan

[21] Appl. No.: 293,967

[22] Filed: Aug. 24, 1994

[30] Foreign Application Priority Data

Aug. 24, 1993 [JP] Japan ................ 5-046079 U

[51] Int. Cl.$^6$ .................................... G03B 29/00
[52] U.S. Cl. ........................... 396/155; 396/420
[58] Field of Search ..................... 354/82, 126, 293

[56] References Cited

U.S. PATENT DOCUMENTS

| D. 302,697 | 8/1989 | Parrish . |
|---|---|---|
| 4,104,623 | 8/1978 | Sloop . |
| 4,208,113 | 6/1980 | Prochnow . |
| 4,255,036 | 3/1981 | Pincetich . |
| 4,319,825 | 3/1982 | Newton . |
| 4,566,768 | 1/1986 | Bosdet . |
| 4,710,005 | 12/1987 | Bennett . |
| 4,866,465 | 9/1989 | Gallegos . |

FOREIGN PATENT DOCUMENTS

| 56-18921 | 2/1981 | Japan . |
|---|---|---|
| 56-55823 | 5/1981 | Japan . |
| 60-166935 | 8/1985 | Japan . |
| 62-142041 | 9/1987 | Japan . |
| 63-174027 | 7/1988 | Japan . |

*Primary Examiner*—David M. Gray
*Attorney, Agent, or Firm*—Oliff & Berridge

[57] ABSTRACT

A flash bracket with an attached grip that does not affect the photographer's mobility or hinder the operation of the camera and that enables one to freely take photographs in the horizontal position (i.e., the landscape mode), the vertical position (i.e., the portrait mode), or with the flash detached from the camera for an off-camera lighting situation. The flash bracket permits a user to adjust the position of the flash with respect to the lens to limit the size of the undesirable shadows during flash photography. The flash bracket features an attached grip that allows a flash device to be easily installed with the flash directly to the side of or at an upwards slant from the camera. The grip is used when the flash is separated from the camera.

17 Claims, 13 Drawing Sheets

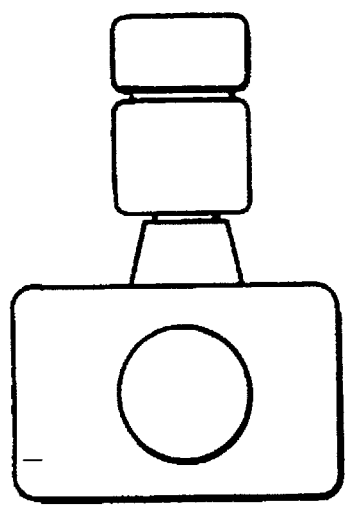
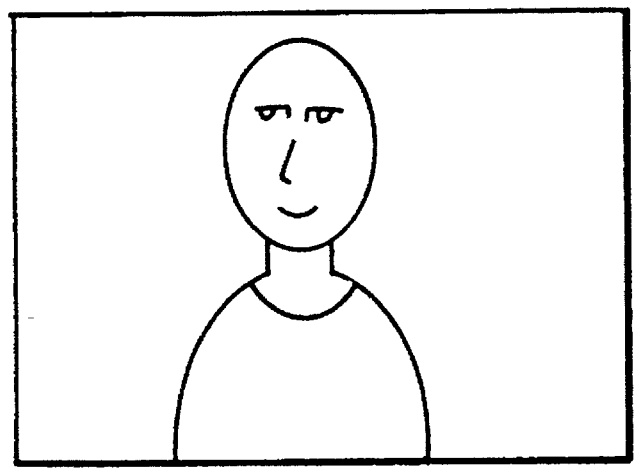
FIG.2

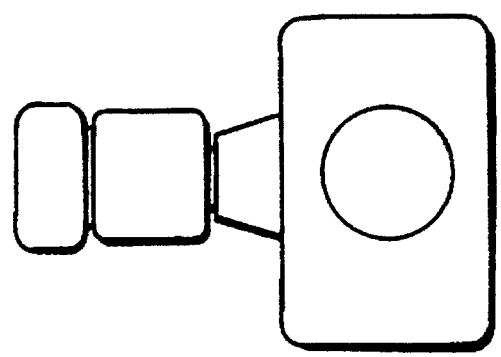
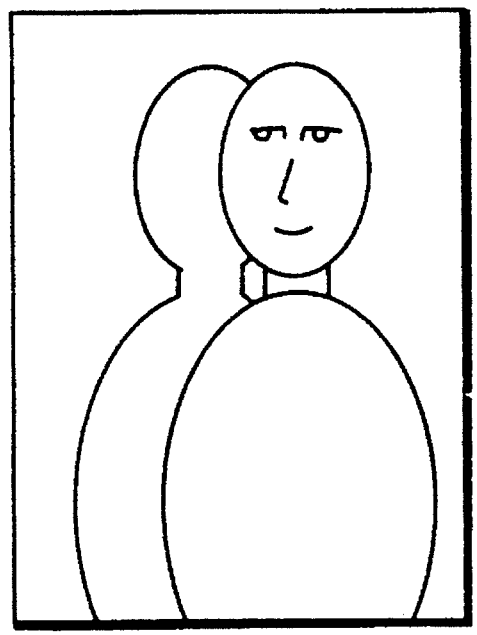
FIG.3

FLASH BRACKET WITH GRIP

BACKGROUND OF THE INVENTION

1. Field of the Invention

The present invention relates to a flash bracket that is used in combination with a camera, and more particularly, to a flash bracket that allows the position of the flash to be easily varied.

2. Description of Related Art

Conventionally, a flash device is classified according to its method of attachment as either a clip-on type or a grip type. As shown in FIGS. 2 and 3, the clip-on type of flash device is attached to the attachment seat (i.e., the accessory shoe). FIG. 3 shows how the clip-on type is used when photography is performed in the vertical position (i.e., the portrait mode). With the grip type, as shown in FIG. 4, the bracket is attached to the tripod screw hole of the camera and the flash is attached to the bracket. Since the grip portion protrudes from the bottom, however, operating the photo lens can be difficult.

FIGS. 2, 3 and 4 show the shadows that occur as a result of various photographic poses in which a person is photographed with a wall in the background. When a clip-on type flash is used to photograph a subject in the horizontal position (i.e., the landscape mode), as shown in FIG. 2, a shadow is formed behind and below the subject which cannot be seen while the subject is being photographed. This minimal shadow, as depicted in FIG. 2, represents an ideal case. When a clip-on type flash is used to photograph a subject in the portrait position, however, as shown in FIG. 3, an unsightly shadow the same height as the photographic subject is produced directly beside it. Also, when the flash bulb of the clip-on flash device is positioned at the upper corner of the camera and a photograph is taken, a shadow is produced on the wall in the manner shown in FIG. 4 and, even though the shadow is smaller than that of FIG. 3, whether the photograph is taken in the portrait or the landscape mode, a desirable shadow projection similar to that of FIG. 2 cannot be obtained.

Japanese patent publications 56-18921, 62-142041, and 63-174027 reveal devices that transform shadows similar to those shown in FIG. 3 into shadows like that of FIG. 2 when photographs are taken in the portrait mode with a clip-on type flash. These devices are comprised of brackets in which the flash is removed from the accessory shoe of the camera and positioned on the side of the camera.

Japanese patent publication 60-166935 also reveals a grip-type flash device that forces shadows diagonally downward from the position shown in FIG. 4 toward the position shown in FIG. 2. The flash supporting bracket presented in publication 56-18921, however, has no other function than to transform a clip-on type flash to a grip type flash. Thus, even though the shadow position of FIG. 3 may be avoided, the shadow caused by the grip type flash as depicted in FIG. 4 cannot be avoided.

Several problems exist with the brackets presented by 62-142041 and 63-174027, and with the grip type flash presented by 60-166935. Although the shadows shown in FIG. 3 that result when photography is performed in the portrait mode may be avoided, the flash angle and the photography angle do not coincide, and a non-uniform illumination results because the light emitting portion of the flash is rotated 90° relative to an axis that coincides with or is parallel to the optical axis of the photographic optical system. Furthermore, because the position of the shadow changes with each photograph in all of the prior art technology examples referred to above, and because complicated procedures are required to change the position of the flash, opportunities for photographs may be missed.

SUMMARY OF THE INVENTION

An objective of the present invention is to provide a flash bracket with a grip that resolves the problems associated with the prior art, that does not hinder the photographer's mobility, that does not interfere with the operation of the camera, and with which photography may be freely performed in the landscape mode, the portrait mode, or by means of off-camera lighting with the flash removed from the camera.

In order to accomplish these and other objectives, a bracket is affixed to the tripod screw hole of the camera in the manner shown in FIG. 1. The flash is affixed to the flash platform on the top of the flash supporting plate, the bracket and the flash supporting plate being attached by means of a locking screw. As shown in FIGS. 1 and 5, the attachment position of the flash is such that it may be freely installed and removed in the top-to-bottom position. With the setting shown in FIG. 1, a shadow similar to that of FIG. 4 will occur during both portrait and landscape photographic positions. With the setting shown in FIG. 5, a shadow similar to that of FIG. 2 can be obtained when photography is performed in the portrait position.

The clip that has the function of protecting the flash from external forces, such as those resulting when the camera is dropped or the like, also has the function of serving as a gripping handle when the flash is separated from the camera and used for unrestricted lighting because it is rotatable as shown in FIG. 6. Also, because the lever is made so as to be operated by the thumb of the left hand when the bracket and the flash supporting plate are separated, it can be conveniently handled. By this means, the mobility of the conventional grip type flash is achieved.

With the present invention, because the direction of the shadow projection is changed, the lighting can be easily changed in cases in which the relative positions of the camera and flash are changed as the lever is arranged so as to be thrown to the front by the thumb of the left hand while supporting the camera in the right hand and the clip in the left hand.

BRIEF DESCRIPTION OF DRAWINGS

The invention will be described in detail with reference to the following drawings in which like reference numerals refer to like elements and wherein:

FIG. 2 shows the shadow that results when photography is performed in the landscape mode with a conventional clip-on type flash.

FIG. 3 shows the shadow that results when photography is performed in the portrait mode with a conventional clip-on type flash.

DETAILED DESCRIPTION OF PREFERRED EMBODIMENTS

Figure 1:
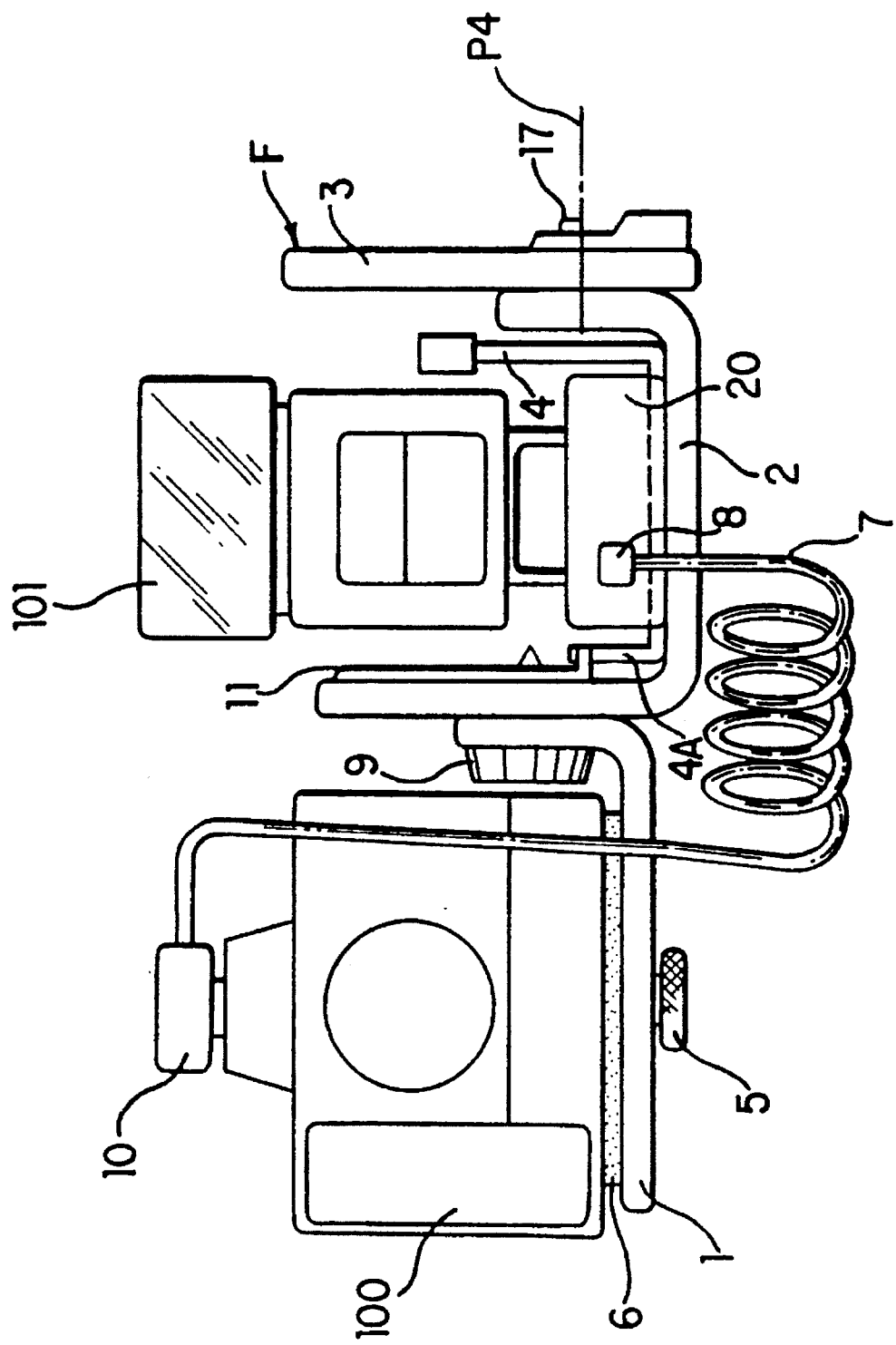
FIG. 1 shows an embodiment of the present invention depicting the light emitting portion of the flash positioned at the upper corner of the photo lens of the camera.
Figure 4:
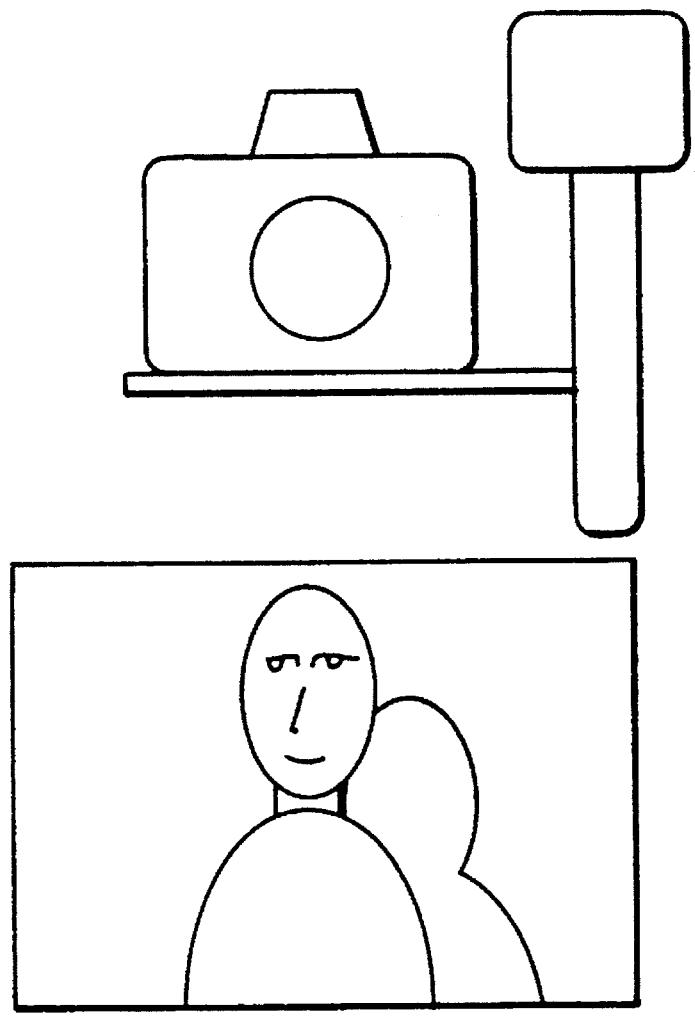
FIG. 4 shows the shadow that results when photography is performed in the portrait or landscape mode with a conventional grip type flash.

FIG. 1 shows a first embodiment of the present invention. When photography is performed with the setting of FIG. 1, a shadow results similar to that shown in FIG. 4. The setting of FIG. 1 is such that the bottom surfaces of the bracket 1 and the flash supporting plate 2 are virtually at the same level, which represents an appropriate configuration for those cases in which the camera/flash set of the present invention is placed on the top of a table, and also for cases in which the set is carried.

The bracket 1 is attached by means of an attachment screw 5 to a camera 100. Before assembly, a cushion 6 is inserted between the bracket 1 and the camera 100. The flash 101 is installed in the accessory shoe (not shown) at the upper surface of the flash platform 20, which is affixed to the flash supporting plate 2. The bracket 1 and the flash supporting plate 2 are attached by the locking screw 9.

The locking screw 9, the lock plate 11, and levers 4 and 4A are operational components that allow the unrestricted separation and rejoining of the bracket 1 and the flash supporting plate 2.

The grip 3 is rotatable relative to the flash supporting plate 2 about the axis P4, and is normally set in the upper direction in the manner shown in FIG. 1. The grip 3 protects the flash 101 from an external force F.

The end 10 of the cord 7 attaches to the accessory shoe of the camera, connecting it to the internal electrical circuitry of the camera. The other end passes from the undercarriage of the flash 101 through an accessory shoe (not shown) positioned on the top of the flash platform 20 and connects to the flash platform 20 through connector 8, thereby completing the electrical connection to the internal circuitry of the flash 101.

A DC-DC converter circuit is contained within the flash platform 20. The circuit includes a power supply and functions to decrease the normal recharging time of the flash 101 by supplying a high voltage power supply to a main condenser that increases the power supply voltage and accumulates the light emitting energy of the attached flash 101.

Figure 9:
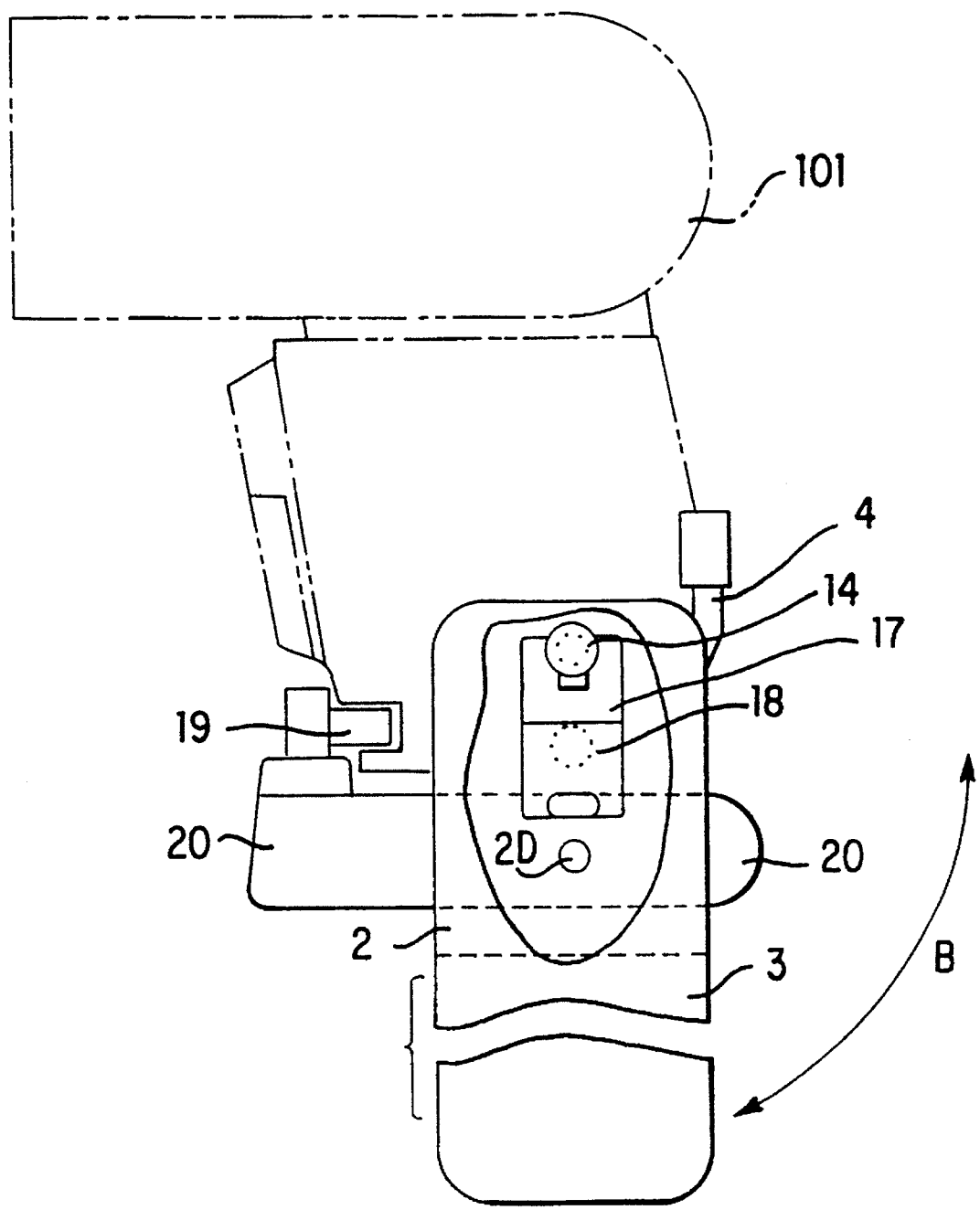
FIG. 9 shows an embodiment of the present invention depicting a view in the X direction of FIG. 10 and also showing the grip portion.

Thus, as shown in FIG. 9, the flash 101 and the flash platform 20 are electrically and mechanically connected through connection terminal 19.

Figure 5:
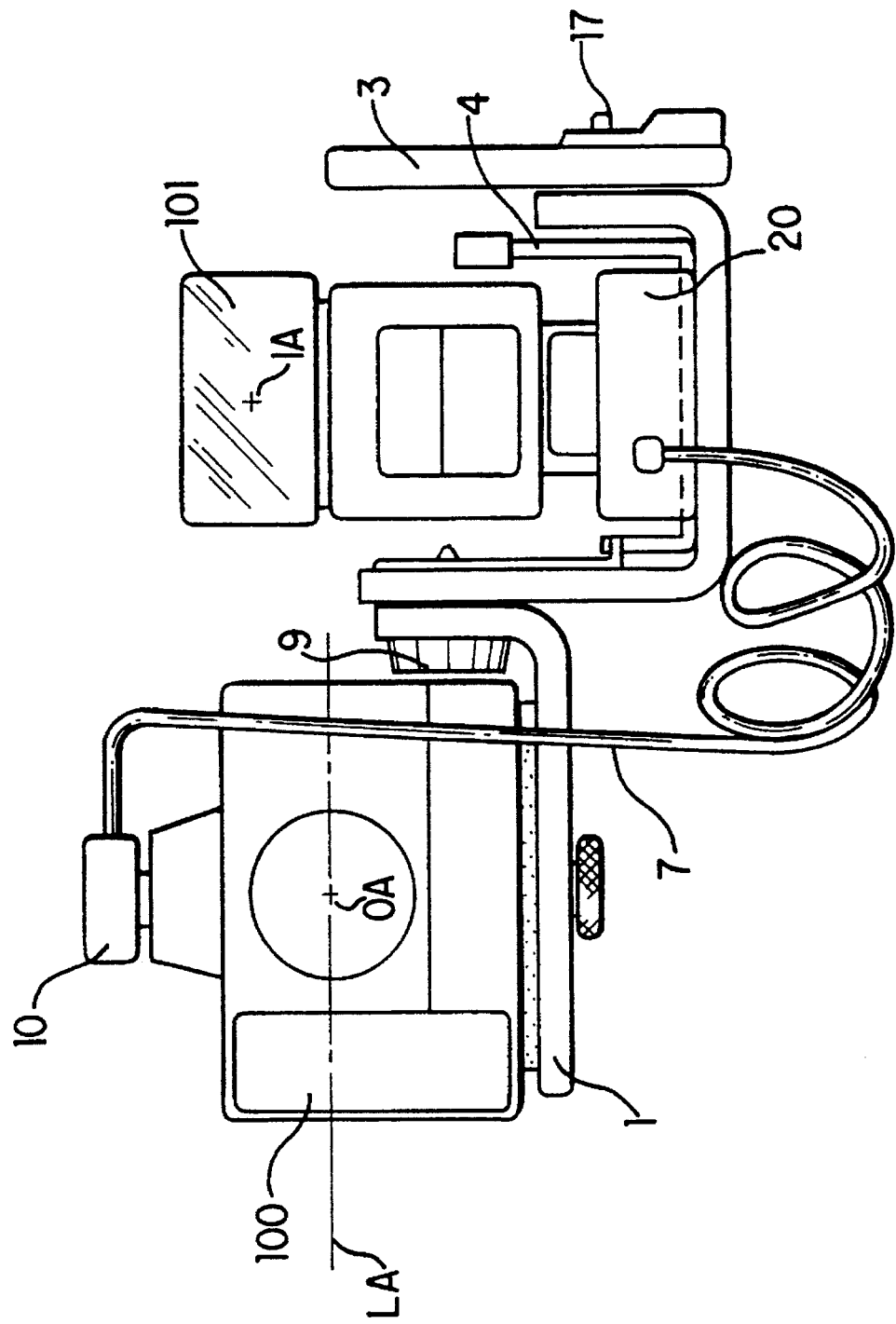
FIG. 5 shows an embodiment of the present invention depicting the light emitting portion of the flash positioned virtually level with the photographic lens of the camera.

FIG. 5 shows the attached position of the flash 101 in a lowered state relative to the camera 100. An ideal shadow (one that is formed below the photographic subject) as shown in FIG. 2 can be formed when taking a photograph in the portrait mode because the radiating component of the flash and the photographic lens are at virtually the same height. An optical axis OA extends from the center of the lens in a direction normal to the page. Similarly, an illumination axis IA extends from the center of the light emitting portion of the flash 101 in a direction normal to the page. A level axis LA extends parallel to the base of the camera 100 and the bracket 1.

Figure 6:
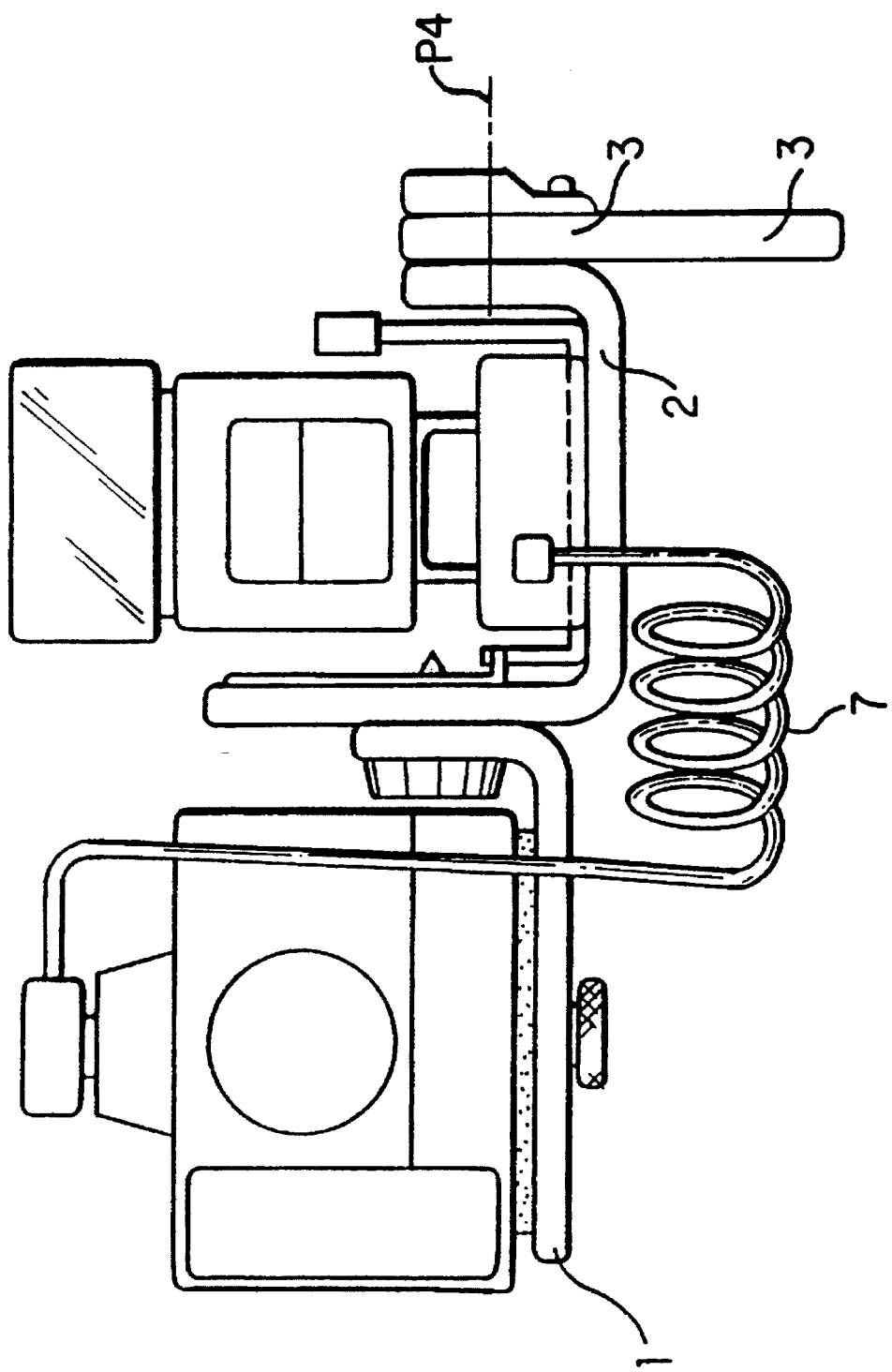
FIG. 6 shows an embodiment of the present invention depicting the grip portion moved to the downward direction.

FIG. 6 shows how the grip 3 can be rotated to the downward position about the axis P4.

Figure 10:
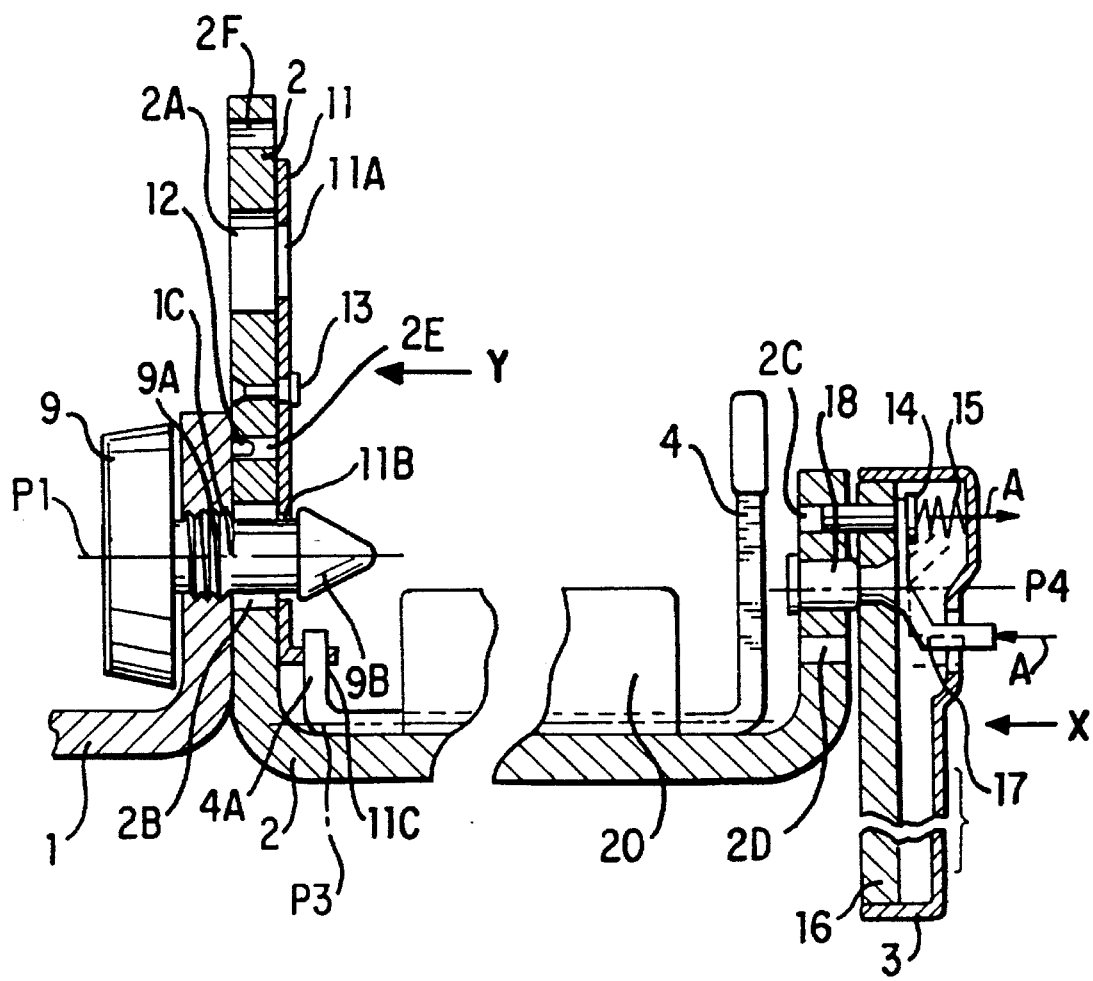
FIG. 10 shows an embodiment of the present invention depicting the mechanism that attaches and removes the camera side bracket and the flash side component, as well as the grip locking mechanism.
Figure 11:
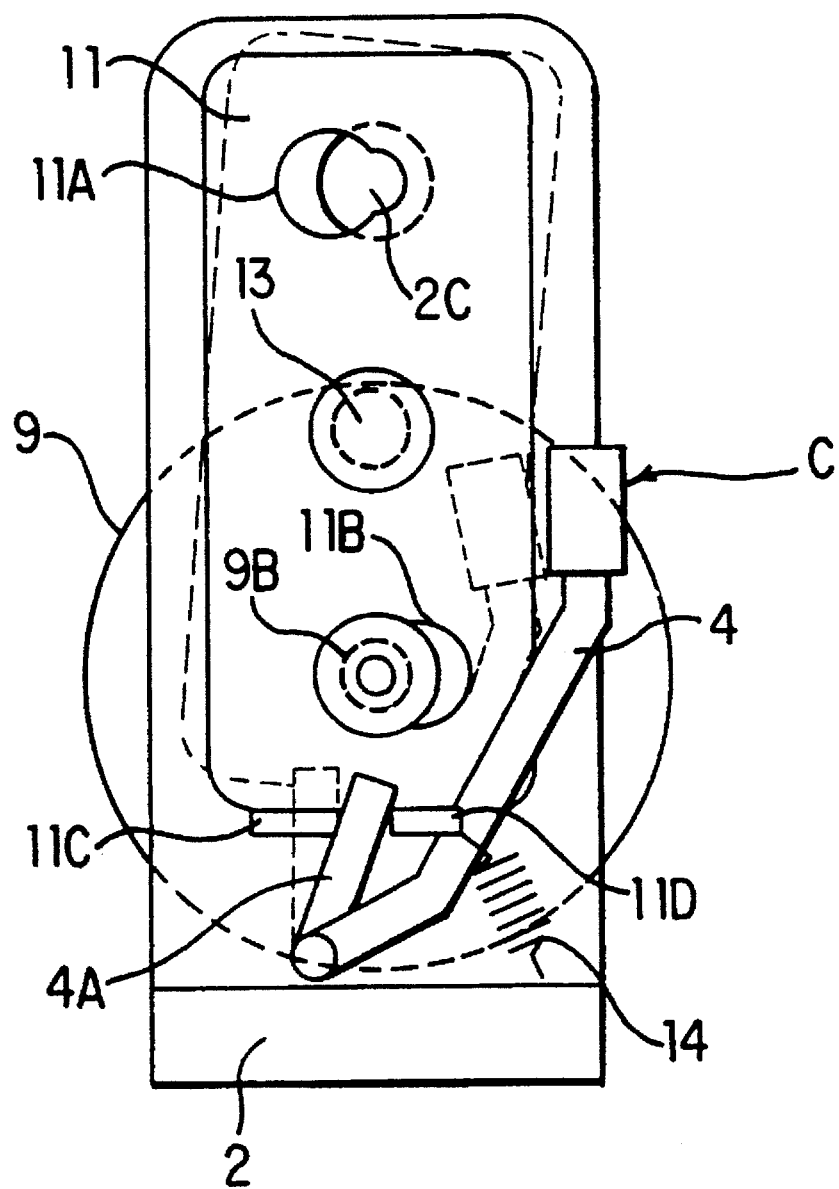
FIG. 11 shows an embodiment of the present invention depicting a view in the Y direction of FIG. 10, and shows the mechanism that attaches and removes the camera side bracket and the flash side component.

FIGS. 10 and 11 illustrate how the bracket 1 and the flash supporting plate 2 can be separated and rejoined. The threaded portion 9A of the locking screw 9 connects with the screw hole 1C of the bracket 1, the lock plate 11 being attached to the flash supporting plate 2 by means of a pin 13 so that it may rotate freely. The tapered front end portion 9B of the locking screw 9 passes through holes 2A and 2B of the flash supporting plate 2 and through insertion holes 11A and 11B of the lock plate 11, the tapered portion catching and being held by the lock plate 11. In this stated the flash supporting plate and the lock plate 11 are connected by being interposed between the bracket 1 and the tapered front end portion 9B of the locking screw 9 when it is rotated unidirectionally. The pin 12, which is unitarily formed with the bracket 1, connects to holes 2E and 2F of the flash supporting plate 2, the bracket being held so as to be incapable of rotating relative to the flash supporting plate 2 about axis P1.

The method of separating the bracket 1 and the flash supporting plate 2 is described as follows. The lever 4 runs right to left through the groove in the bottom surface of the flash platform 20, the opposite end 4A being connected between projections 11C and 11D of the lock plate 11. When the other end of the lever 4 is tripped in the direction of arrow C, the lever 4 rotates about axis P3 in a movement that is transmitted to the opposite end 4A and rotates the lock plate 11 to the position shown by the dashed line in FIG. 11. In this state, holes 2A and 2B of the flash supporting plate 2 align with insertion holes 11A and 11B of the lock plate 11, both sets of holes coinciding, and the tapered front end portion 9B of the locking screw 9 becomes capable of passing through. When the force on lever 4 in the direction of the arrow C is removed, lever 4 returns to its original position by the force of spring 14.

Figure 7:
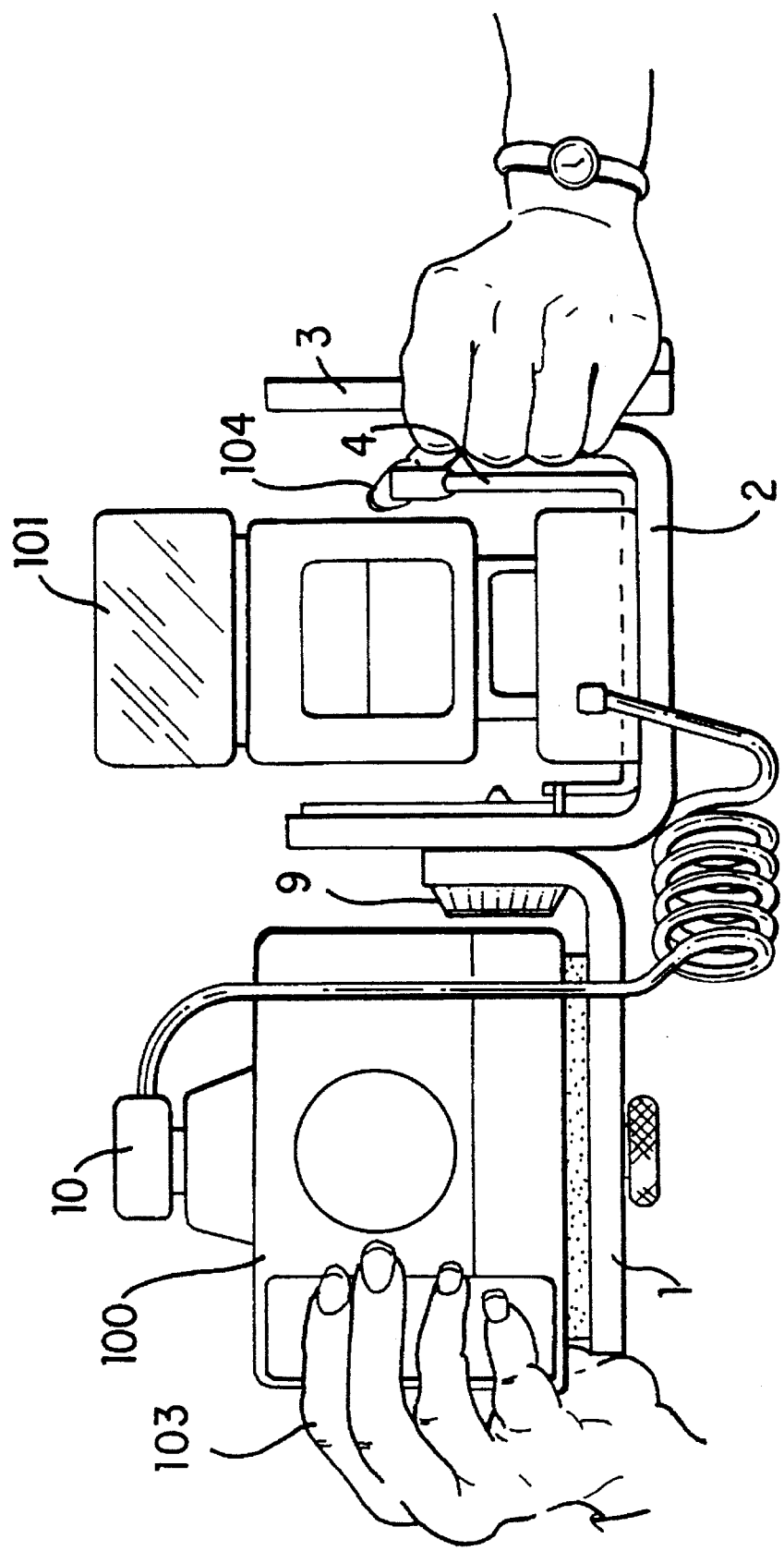
FIG. 7 shows an embodiment of the present invention depicting the operation that separates the side of the camera and the side of the flash.

When the locking screw 9 is loosened and the lever 4 is tripped forward by the thumb of the left hand 104 while the camera is supported by the right hand 103 and the grip 3 is supported by the left hand 104, as shown in FIG. 7, the bracket 1 and the flash supporting plate 2 can be separated. After separation, the tapered front end portion 9B of the locking screw 9 is taken from one of the connecting holes 2A and 2B in the flash supporting plate 2 and inserted into the other. At this point, the tapered front end portion 9B is inserted into one of the insertion holes 11A and 11B of the lock plate 11, and the lock plate 11 is rotated in the direction of the dashed lines shown in FIG. 11. Furthermore, when the tapered front end portion 9B is inserted into insertion holes 11A or 11B, the lock plate 11 is returned to its original position through the return force of the spring 14, and the tapered front end portion 9B cannot be removed. The bracket 1 and the flash supporting plate 11 are then connected and cannot be separated without the operation of lever 4. Finally, the lock screw 9 is rotated and tightened firmly so that the bracket 1 and the flash supporting plate 2 will not rattle. In this manner, the configuration can be changed from that shown in FIG. 1 to that shown in FIG. 5, or vice-versa.

Figure 8:
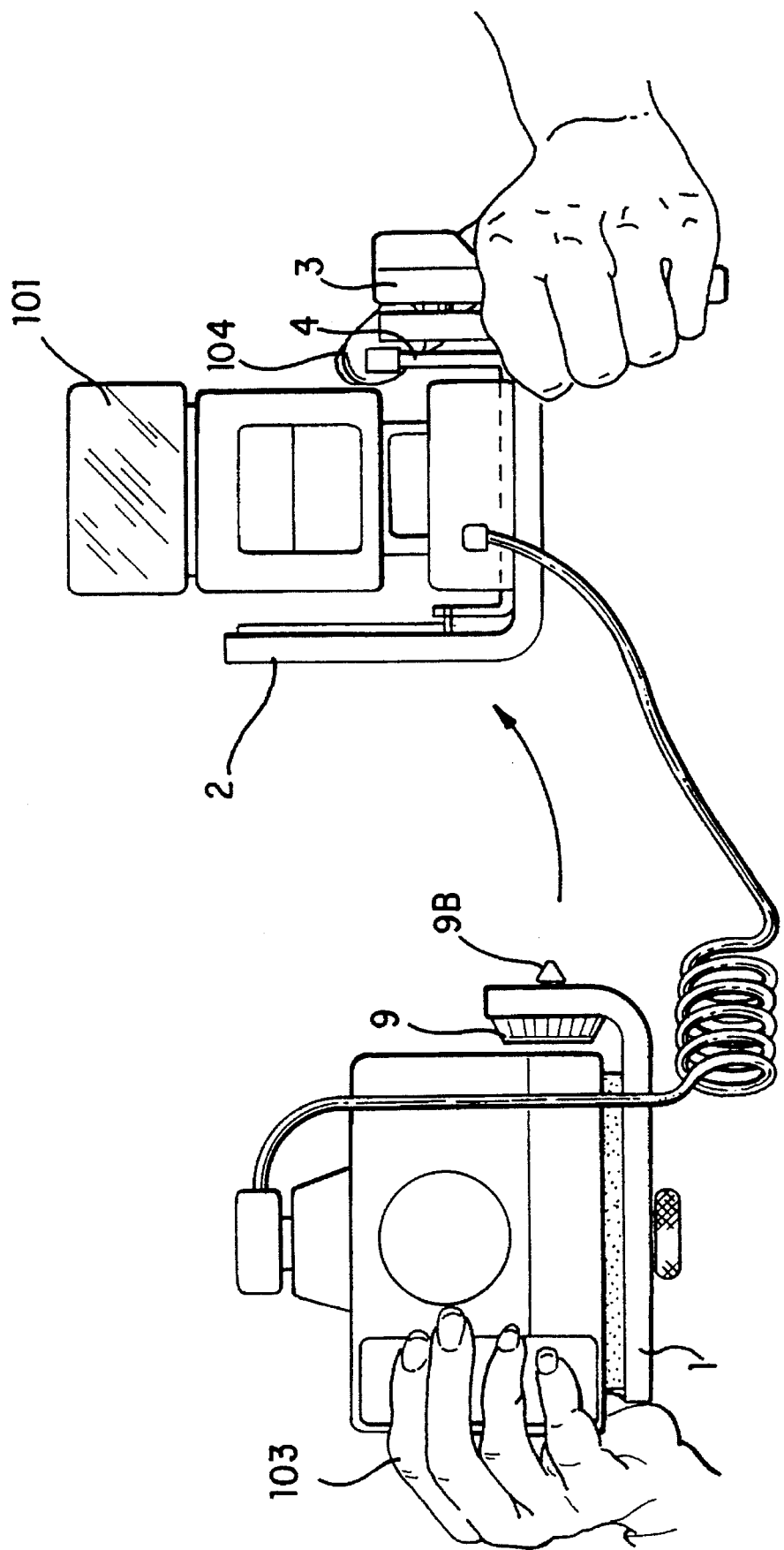
FIG. 8 shows an embodiment of the present invention depicting the state in which the side of the flash is separated from the camera and off-camera photography is performed.

The same steps are followed when it is desired to separate the flash from the camera to make a lighting change. First, the grip 3 is rotated about the axis P4 from the position shown in FIG. 1 in the downward direction to the position shown in FIG. 6. Next, the locking screw 9 is loosened, the camera 100 and the grip 3 being held in the manner shown in FIG. 8, and the lever 4 being tripped forward by the thumb of the left hand 104, and the flash supporting plate 2 being separated from the bracket 1. The flash is thus supported by the left hand and the desired lighting may be freely chosen.

FIGS. 9 and 10 show the rotating mechanism of the grip 3, which is attached to the base plate 16. The base plate 16 is attached to the flash supporting plate 2 by means of a rotating spindle 18, which allows it to freely rotate about axis P4. A stopper 14 is passed through the hole in the base plate 16, the front end of the stopper 14 being pushed into the stopper receiving holes 2C and 2D of the flash supporting plate 2 by the force of the spring 15, stopping the rotation of the grip 3.

When the grip 3 is rotated by pressing the release button 17 in the direction of arrow A as shown in FIG. 10, the front end of the release button 17 resists the force of the spring 15 and raises the stopper 14 (i.e. the arrow A in FIG. 10). As a result, the stopper 14 is separated from its connection with stopper receiving holes 2C and 2D, and is freely rotatable. When the grip 3 is rotated, and moved 180° to the opposite side, and when the front end of the stopper 14 reaches the stopper receiving hole 2C or 2D (whichever is on the opposite side), the stopper 14 is once again pushed into the stopper receiving hole 2C or 2D, and the grip 3 is held in the opposite position.

Figure 12:
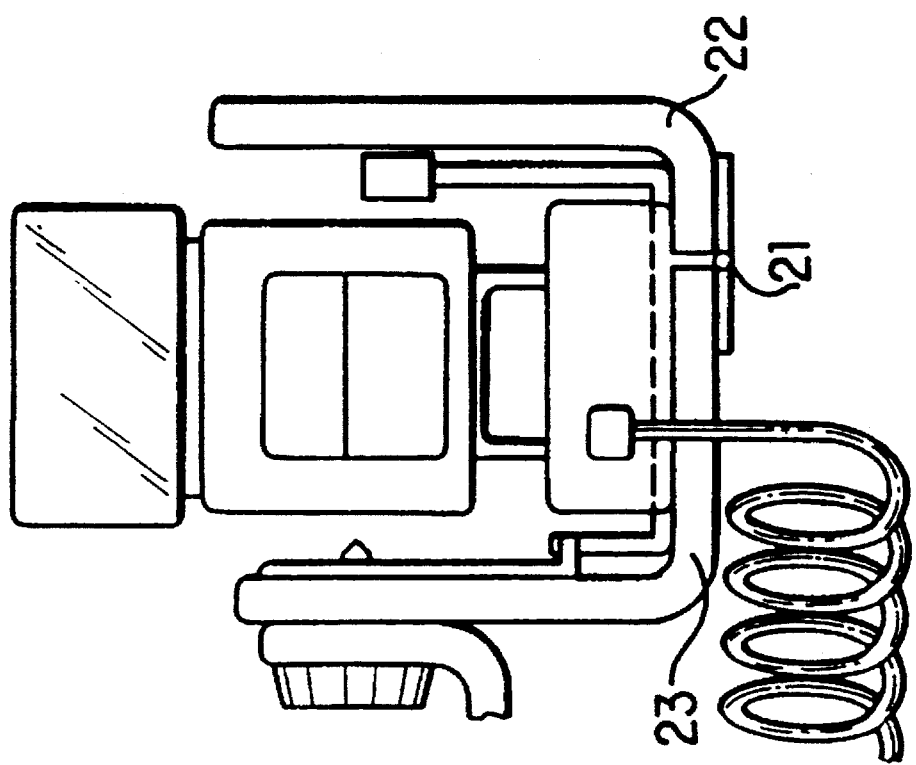
FIG. 12 shows the primary operational state of the second embodiment of the present invention.
Figure 13:
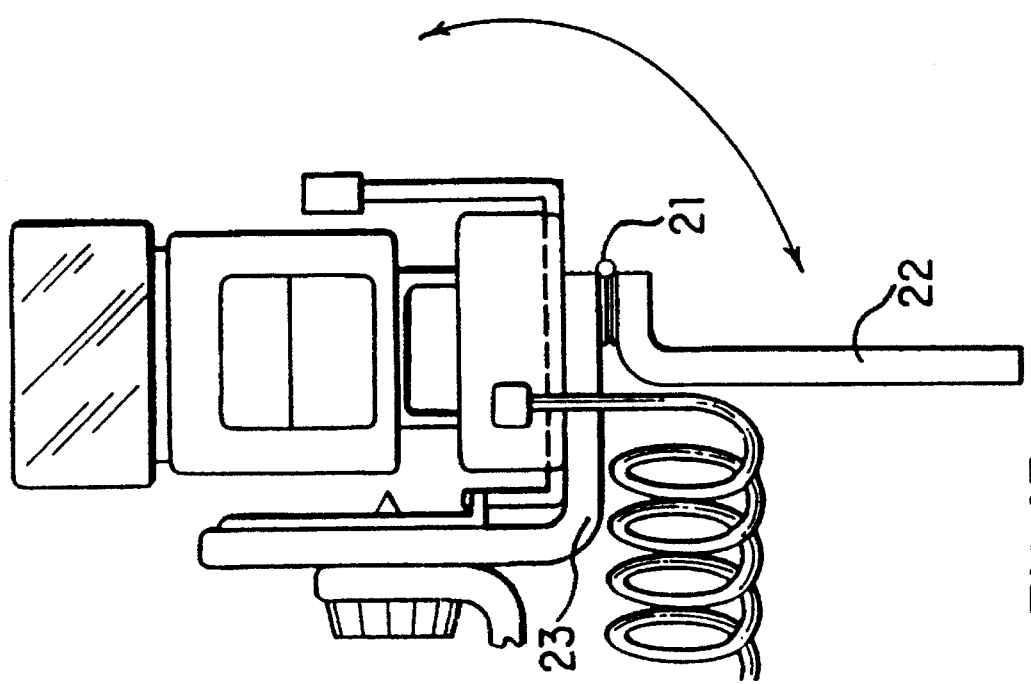
FIG. 13 shows the secondary operational state of the second embodiment of the present invention.

FIGS. 12 and 13 show a second embodiment of the present invention in which the means of moving the grip differs from that of the first embodiment. The grip 22 is joined to the flash supporting plate 23 through a hinge 21. When flash photography is performed with the flash detached from the camera, the grip 22 is rotated about the hinge 21 as shown in FIG. 13 and attached by a stopper (not shown).

Since the bottom surfaces of the camera and the flash are virtually at the same level, the camera remains easy to handle during situations in which a strap is used to suspend the camera from the neck or shoulder, or when the camera is placed on top of a table. Because the grip portion is movable, it does not interfere with operating the lens with the left hand, as occurs with a conventional grip type flash. When the grip portion is set on the side surface of the flash, the flash is also protected from external forces. Furthermore, according to the present invention, because a clip-on type flash can be used like a conventional grip type flash, it is not necessary to make the special purchase of a costly grip type flash.

Although this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A device for reducing shadows during flash photography, comprising:

a camera having a lens and a base, said lens having a center point from which an optical axis extends in a normal direction toward a subject, said camera having a level axis extending parallel to said base and intersecting said optical axis;

a flash assembly having a light source, said light source having an illumination axis projecting toward said subject;

a bracket having a first portion and a second portion, said first portion being attached to said base of said camera, and said second portion having a handle and being attached to said flash assembly; and connecting means for detachably connecting said first portion and said second portion of said bracket, said connecting means including a lever that is movable between a first position in which said lever engages an assembly to connect said first portion and said second portion and a second position in which said lever disengages said assembly to disconnect said first portion and said second portion, said lever being disposed within reach of a photographer holding said handle of said second portion, wherein a user can position said second portion of said bracket relative to said first portion such that the distance between said illumination axis of said light source and said level axis in a first configuration is minimized.

2. The device for reducing shadows during flash photography according to claim 1, further comprising a power cord having a first end connected to said camera and a second end connected to said flash assembly such that said power cord transfers power from said camera to said flash assembly.

3. The device for reducing shadows during flash photography according to claim 2, wherein said device has a second configuration in which said second portion of said bracket can be detached from said first portion of said bracket while said flash assembly remains connected to said camera via said power cord.

4. The device for reducing shadows during flash photography according to claim 1, wherein said handle is rotatable.

5. The device for reducing shadows during flash photography according to claim 1, wherein said handle has a fixed end attached to said second portion of said bracket, said handle being rotatable between an upper position and a lower position, said handle in said upper position extending upward from said second portion of said bracket adjacent and parallel to said flash assembly, wherein said handle in said upper position protects said flash assembly from damage in the event that said user drops said camera during use.

6. The device for reducing shadows during flash photography according to claim 4, wherein the axis of rotation of said handle is parallel to said level axis.

7. The device for reducing shadows during flash photography according to claim 4, wherein the axis of rotation of said handle is parallel to said illumination axis.

8. The device for reducing shadows during flash photography according to claim 1, wherein said connecting means further comprises:

first attachment means that projects from said first portion of said bracket through an aperture in said second portion of said bracket; and second attachment means being attached to said second portion of said bracket and detachably connectable to said first attachment means, thereby connecting said first portion of said bracket to said second portion of said bracket.

9. The device for reducing shadows during flash photography according to claim 8, wherein said lever has a first part and a second part, said first part being accessible to said user during use of said camera, and said second part being disposed to secure said first attachment means and said second attachment means such that said first portion and said second portion of said bracket are connected, wherein actuating said first part releases said second part and separates said bracket.

10. The device for reducing shadows during flash photography according to claim 8, wherein said second attachment means further comprises a plurality of apertures, said apertures being vertically aligned and dimensioned to receive said first attachment means and disposed in said second portion of said bracket.

11. The device for reducing shadows during flash photography according to claim 10, further comprising a lock plate, said lock plate being connected to said lever and disposed against said second portion of said bracket, said lock plate having at least one opening dimensioned to receive said first attachment means.

12. The device for reducing shadows during flash photography according to claim 11, further comprising a spring, said spring being connected to said lock plate such that said spring urges a periphery of said opening of said lock plate against said first attachment means.

13. A device for reducing shadows during flash photography, comprising:
   a camera having a lens and a base, said lens having a center point and an optical axis projecting normally therefrom toward a subject, said camera having a level axis extending parallel to said base and intersecting said optical axis;
   a flash assembly having a light source, said light source having an illumination axis projecting toward said subject;
   a bracket having a first portion and a second portion, said first portion being attached to said base of said camera, and said second portion being attached to said flash assembly; and
   connecting means for detachably connecting said first portion and said second portion of said bracket, said connecting means having a first part projecting from said first portion of said bracket, said connecting means having a second part comprising:
      a series of apertures disposed in said portion of said bracket, said series of apertures being vertically aligned,
      retention means for retaining said first part in one of said series of apertures, said retention means being biased to at least partially cover said one of said series of apertures, and
      a lever attached to said retention means to uncover said one of said series of apertures, wherein said second portion of said bracket can be moved vertically with respect to said first portion of said bracket by actuating said lever to release said first attachment means from said one of said series of apertures, inserting said first attachment means into another of said series of apertures, and releasing said lever to allow said retention means to retain said first attachment means.

14. A camera flash bracket for reducing shadows during flash photography, comprising:
   a bracket, said bracket having a first portion and a second portion, said first portion being dimensioned to fit beneath and within a periphery of a bottom surface of a camera, said first portion having a first aperture for threadedly connecting said flash bracket to said camera, said second portion extending perpendicularly from one end of said first portion and having a second aperture;
   a pad dimensioned to lie between and within the periphery of the top surface of said bracket and the bottom surface of said camera;
   a flash support plate, said flash support plate being a U-shaped plate and having a first upright portion, a horizontal portion, and a second upright portion, said first upright portion being disposed adjacent said second portion of said bracket and having a series of apertures, said horizontal portion extending from one end of said first upright portion and forming a base for attaching a flash assembly, said second upright portion extending from said horizontal portion and being disposed opposite from said first upright portion;
   a rotatable handle connected to said second upright portion of said flash support plate;
   an adjustment screw, said adjustment screw having a knobbed head, a threaded portion, an unthreaded portion, and a conically-shaped point, a diameter of said conically-shaped point being greater than a diameter of said unthreaded portion, said adjustment screw being dimensioned to threadedly engage said second aperture of said second portion of said bracket and to pass through one of said series of apertures of said first upright portion of said flash support plate; and
   a lever assembly, said lever assembly being connected to said flash support plate and having an actuation portion and a retaining portion, said actuation portion being disposed proximate a hand of said user, said retaining portion having a series of openings corresponding to said series of apertures, said openings having an insertion hole joined to a retaining hole, said insertion hole being dimensioned to receive said conically shaped point of said adjustment screw, said retaining hole being dimensioned to engage said unthreaded portion, whereby moving said lever allows said user to separate and reconnect said bracket and said flash plate.

15. A method of reducing shadows during flash photography, the method comprising the steps of:
   attaching a first portion of a bracket to a camera;
   attaching a second portion of said bracket to a flash assembly;
   connecting said first portion with said second portion by actuating a lever attached to said second portion within reach of a photographer holding said camera, said lever being movable between a first position in which said lever connects said first portion and said second portion and a second position in which said lever disconnects said first portion and said second portion; and
   aligning said flash assembly with said camera such that an alignment axis extending through a center of a lens of said camera and a center of said flash assembly is in one of an approximately horizontal direction or an approximately vertical direction.

16. The method according to claim 15, wherein said alignment axis in a landscape mode extends in said approximately horizontal direction.

17. The method according to claim 15, wherein said alignment axis in a portrait mode extends in said approximately vertical direction.

* * * * *